(12) United States Patent
Chan et al.

(10) Patent No.: US 8,731,347 B2
(45) Date of Patent: May 20, 2014

(54) LENS STANDOFF AND PROTECTION FOR OPTICAL COMMUNICATION SYSTEMS

(71) Applicant: Avago Technologies General IP (Singapore) Pte. Ltd., Singapore (SG)

(72) Inventors: Seng-Kum Chan, Santa Clara, CA (US); David J. K. Meadowcroft, San Jose, CA (US); Hui Xu, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 35 days.

(21) Appl. No.: 13/649,906

(22) Filed: Oct. 11, 2012

(65) Prior Publication Data

US 2014/0105535 A1    Apr. 17, 2014

(51) Int. Cl.
*G02B 6/12* (2006.01)
*G02B 6/43* (2006.01)
*G02B 6/42* (2006.01)

(52) U.S. Cl.
CPC ............... *G02B 6/43* (2013.01); *G02B 6/4292* (2013.01); *G02B 6/4293* (2013.01); *G01B 6/4249* (2013.01)
USPC .................................. 385/14; 385/88; 385/93

(58) Field of Classification Search
CPC .......... G02B 6/43; G02B 6/12; G02B 6/4292; G02B 6/4293; G02B 6/4249; G02B 6/4226
USPC ................................................ 385/14, 88–92
See application file for complete search history.

(56) References Cited

U.S. PATENT DOCUMENTS

| | | | | |
|---|---|---|---|---|
| 5,537,503 A * | 7/1996 | Tojo et al. | | 385/93 |
| 5,604,361 A * | 2/1997 | Isaksson | | 257/99 |
| 6,092,935 A * | 7/2000 | Althaus et al. | | 385/93 |
| 6,793,406 B1 * | 9/2004 | Edwards et al. | | 385/88 |
| 7,348,203 B2 * | 3/2008 | Kaushal et al. | | 438/64 |
| 7,389,026 B2 | 6/2008 | Nagasaka | | |
| 8,317,411 B2 * | 11/2012 | Fujiwara et al. | | 385/92 |
| 8,573,863 B2 * | 11/2013 | Sato | | 385/93 |
| 2006/0227844 A1 | 10/2006 | Guenter | | |
| 2007/0253458 A1 | 11/2007 | Miesak et al. | | |

FOREIGN PATENT DOCUMENTS

JP    58168024 A    4/1983
JP    2006308986 A    9/2006

* cited by examiner

*Primary Examiner* — Ellen Kim (57) ABSTRACT

An opto-electronic system includes a substrate, an opto-electronic chip mounted on the substrate, a frame, and a lens device retained in the frame. A frame mounting portion of the frame is in contact with an upper surface of the opto-electronic chip. A lens mounting portion of the frame is spaced above the frame mounting portion. A lower surface of the lens device is in contact with the lens mounting portion. The spacing of the lens mounting portion and frame mounting portion determines the spacing between the upper surface of the opto-electronic chip and the lower surface of the lens device.

18 Claims, 8 Drawing Sheets

LENS STANDOFF AND PROTECTION FOR OPTICAL COMMUNICATION SYSTEMS

BACKGROUND

In an optical communication system, it is generally necessary to couple an optical fiber to an opto-electronic transmitter, receiver or transceiver device and to, in turn, couple the device to an electronic system such as a switching system or processing system. These connections can be facilitated by modularizing the transceiver device. Such optical transceiver modules include a housing in which are mounted opto-electronic elements, optical elements, and electronic elements, such as one or more light sources (e.g., lasers), light sensors (e.g., photodiodes), lenses and other optics, digital signal driver and receiver circuits, etc. In addition, a transceiver module typically includes an optical connector that can be coupled to a mating connector at the end of a fiber-optic cable.

Various optical transceiver module configurations are known. For example, a configuration commonly referred to as "Small Form Factor Pluggable" or SFP refers to a transceiver module having an elongated housing with a rectangular cross-sectional shape, where the rear of the module has an electrical connector that plugs into a bay of a front-panel cage, and the front of the module has an optical connector that accepts an optical fiber plug. Another module configuration, for example, is commonly referred to as "mid-plane" mounting. A mid-plane mountable transceiver module includes an electrical connector, such as a Landing Grid Array (LGA) or a MEGARRAY™, which are mountable on the surface of a printed circuit board. Mid-plane mountable transceiver modules include "parallel" transceivers that transmit and receive multiple optical signals in parallel, using arrays of light sources and light sensors.

Figure 1:
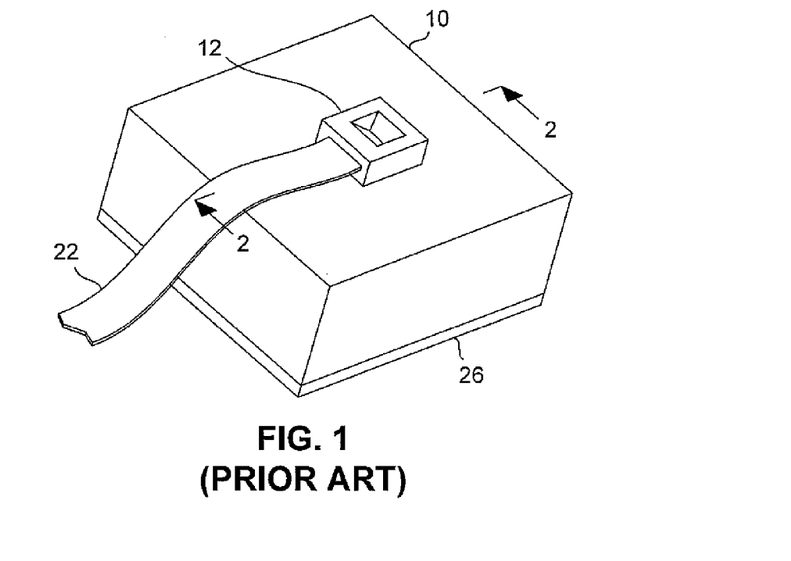
FIG. 1 is a perspective view of an optical communication module, in accordance with the prior art.
Figure 2:
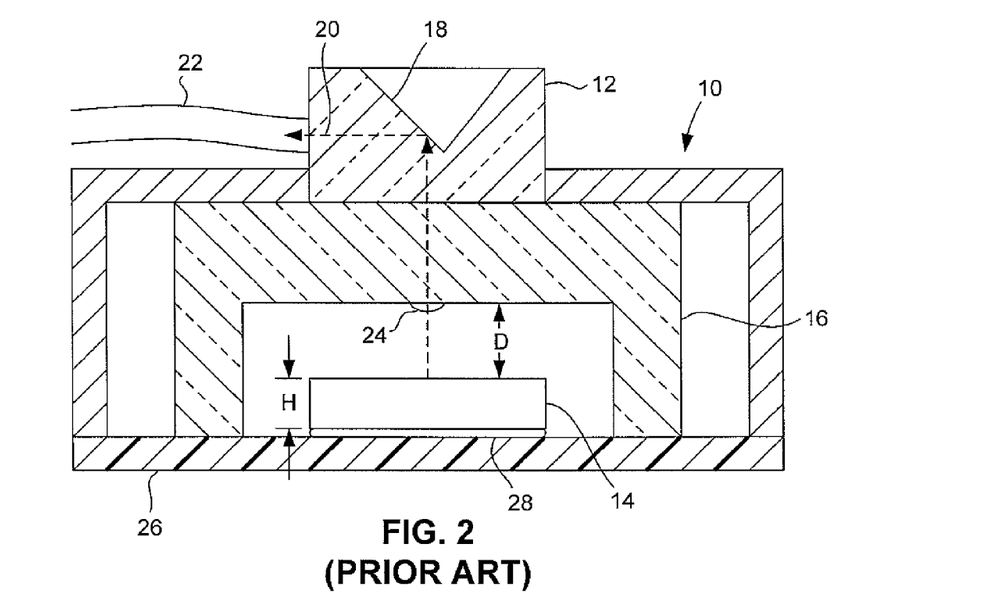
FIG. 2 is a sectional view taken on line 2-2 of FIG. 1.

As illustrated in FIGS. 1-2, one type of mid-plane mountable transceiver module system includes a transceiver module 10 and an optical connector 12 that attaches to transceiver module 10. Transceiver module 10 includes an opto-electronic system that transmits and receives optical signals (i.e., beams) in a direction normal to the printed circuit board (PCB) 26 that forms the base of transceiver module 10. For purposes of clarity, only a single-laser chip 14 (e.g., a chip having a single vertical cavity surface-emitting laser or VCSEL) of such an opto-electronic system is shown in FIG. 2. Optical connector 12 is user-connectable to a receptacle (not shown for purposes of clarity) on the top of transceiver module 10. When connected to transceiver module 10, a portion of optical connector 12 abuts or contacts the top of a lens block 16 (FIG. 2) of the opto-electronic system. Optical connector 12 includes a reflective surface 18 that redirects the parallel optical signals 20 emitted by laser chip 14 at a 90-degree angle into the end of an optical fiber of a ribbon cable 22. Lens block 16 includes at least one lens element 24 in the path of optical signals 20. Lens element 24 collimates the beam or optical signals 20 emitted by laser chip 14.

The accuracy of the spacing or distance D shown in FIG. 2 between laser chip 14 and lens element 24 is critical. If the distance D is too large or too small by even a small amount the beam will not be collimated properly, and signal integrity will be impaired. At least two mechanical tolerances can affect the distance D. Both lens block 16 and laser chip 14 are commonly mounted on the same substrate, such as PCB 26. The height H of laser chip 14 has a tolerance that can affect the distance D. Also, as laser chip 14 is commonly mounted on PCB 26 using an adhesive layer 28 (e.g., epoxy), the tolerance of the thickness of adhesive layer 28 can affect the distance D.

It can further be noted that the force exerted by optical connector 12 against the top of lens block 16 can undesirably displace lens element 24 by a small but optically significant amount, potentially adversely affecting the optical alignment (e.g., the distance D). Excessive force can even potentially crack a lens block 16 made of fragile optical glass.

It would be desirable to provide an optical communication module having a lens arrangement that helps minimize the adverse impact of mechanical tolerances and forces.

SUMMARY

Embodiments of the present invention relate to an opto-electronic system for an optical communication device and to a method of operation of an opto-electronic system in an optical communication device. In an exemplary embodiment, the opto-electronic system comprises a substrate, an opto-electronic chip mounted on the substrate, a frame, and a lens device retained in the frame. The opto-electronic chip has an optical axis normal to the substrate. A lower surface of the opto-electronic chip is in contact with a surface of the substrate. The frame has a frame mounting portion in contact with an upper surface of the opto-electronic chip. The frame also has a lens mounting portion spaced above the frame mounting portion with respect to the optical axis of the opto-electronic chip. The lens device is retained in the frame in an orientation in which a lens element of the lens device is aligned with the optical axis of the opto-electronic chip. A lower surface of the lens device is in contact with the lens mounting portion of the frame.

In an exemplary embodiment, a method of operation of the above-described opto-electronic system comprises communicating optical signals between the opto-electronic chip and the lens device along the optical axis. As the lens mounting portion of the frame is spaced above the frame mounting portion of the frame, the optical signals pass through the space between the upper surface of the opto-electronic chip and the lower surface of the lens device.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 3:
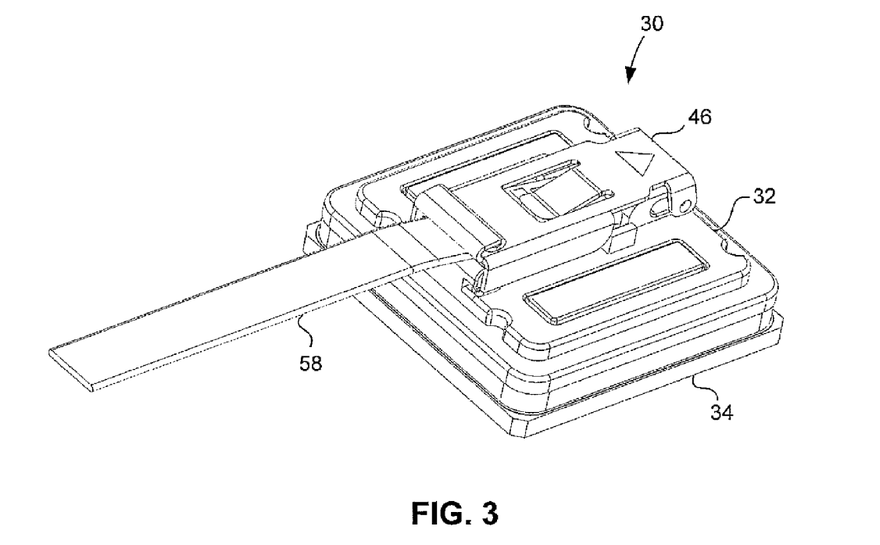
FIG. 3 is a top perspective view of an optical communication module, in accordance with an exemplary embodiment of the invention.
Figure 4:
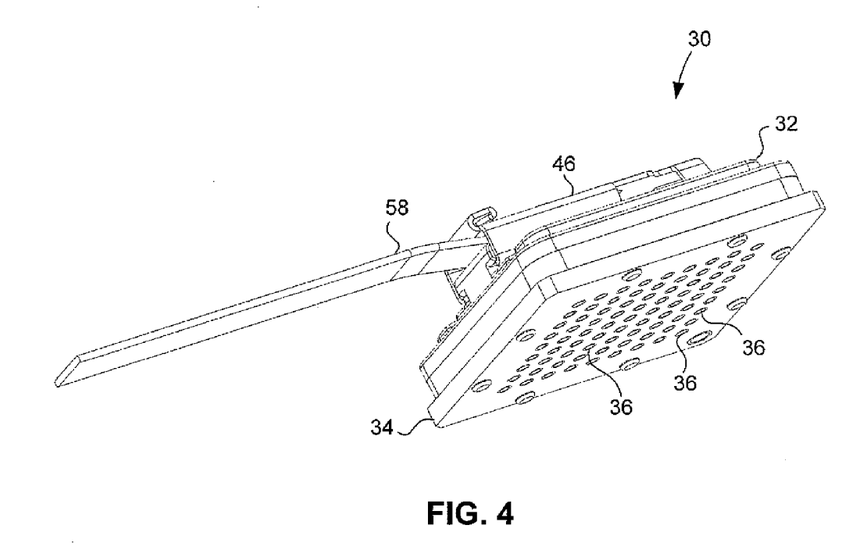
FIG. 4 is a bottom perspective view of the optical communication module of FIG. 3.

As illustrated in FIGS. 3-4, in an illustrative or exemplary embodiment of the invention, an optical data communication device 30 or module includes a housing 32 and a substrate 34, such as a printed circuit board. The lower surface of substrate 34 includes an array of electrical connectors 36 (FIG. 4) that facilitate electrically coupling optical data communication device 30 to another system, such as a printed circuit board (not shown) of a computer, switching device, etc.

Figure 5:
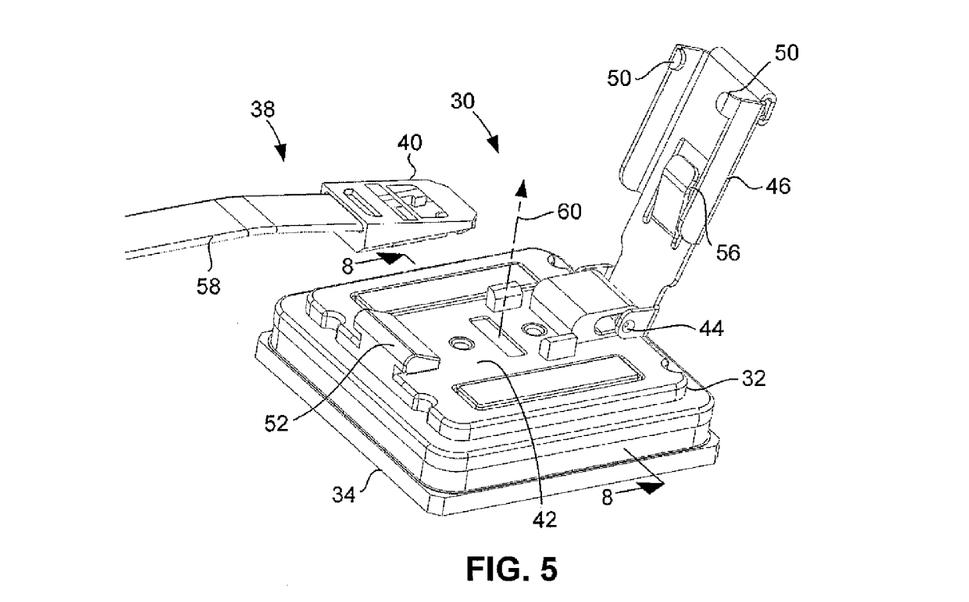
FIG. 5 is similar to FIG. 3, showing the optical receptacle or port of the optical communication module in an open position, with an optical connector removed from the optical receptacle or port.
Figure 6:
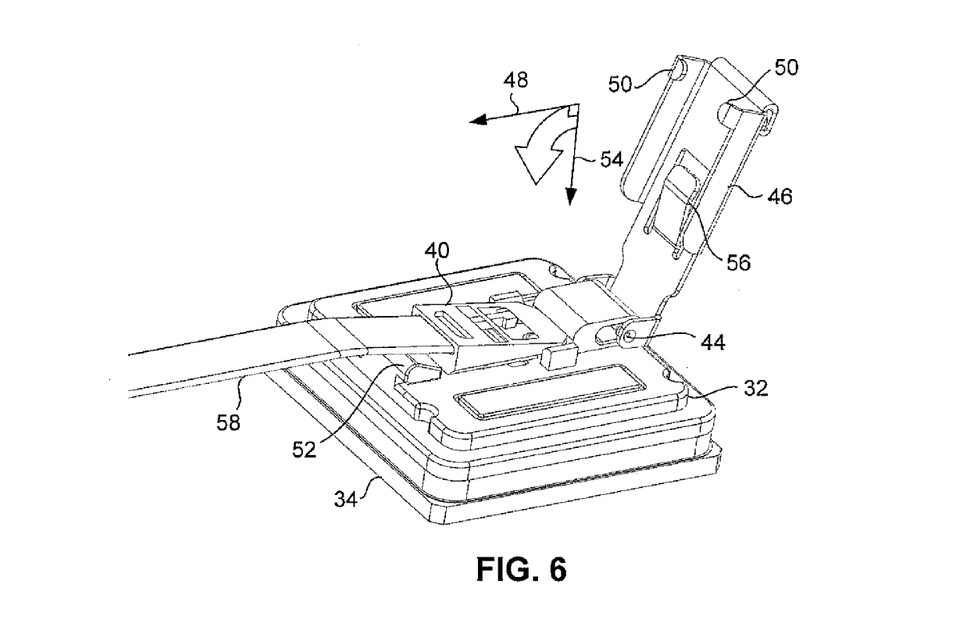
FIG. 6 is similar to FIG. 5, showing the optical connector in the optical receptacle or port.

As illustrated in FIGS. 5-6, a user can connect an optical cable assembly 38 to optical data communication device 30 by placing an optical connector 40 of optical cable assembly 38 on a connector-receiving area 42 (FIG. 5) on top of housing 32. A hinged connection 44 allows a latch 46 to be swung downwardly (as indicated by the curved arrow in FIG. 6) by a user to trap optical connector 40 beneath latch 46 in connector-receiving area 42. The user can then move latch 46 in a lateral direction 48 to secure latch 46 in the fully latched state shown in FIGS. 3-4. More specifically, as the user moves latch 46 in this manner, two prongs 50 on the underside of latch 46 slide into engagement with a T-shaped protuberance 52 on housing 32. It can be noted that the swinging motion of latch 46 indicated by the curved arrow includes motion components in both lateral direction 48 and a normal direction 54 that is oriented normal to substrate 34. In other embodiments (not shown), other types of latches that move in directions having at least a motion component in normal direction 54 may also be suitable.

A spring tab 56 on the underside of latch 46 exerts a force that retains optical connector 40 against the upper surface of housing 32 in connector-receiving area 42. Optical cable assembly 38 further includes an optical ribbon cable 58. In operation, optical data communication device 30 emits parallel optical signals along axes normal to substrate 34, such as along an exemplary optical axis 60 (FIG. 5). A reflective element (not shown) in optical connector 40 redirects these optical signals at a 90-degree angle into the fiber ends of optical ribbon cable 58. Although optical data communication device 30 can emit multiple parallel optical signals (e.g., from multiple lasers), only one such optical axis 60 of one such optical signal is shown for purposes of clarity. Also, although in the exemplary embodiment optical data communication device 30 comprises a transmitter that emits optical signals, in other embodiments such an optical data communication device can comprise a receiver that receives optical signals, or a transceiver that both transmits and receives optical signals. In such other embodiments, the received signals are received along optical axes similar to optical axis 60.

Figure 7:
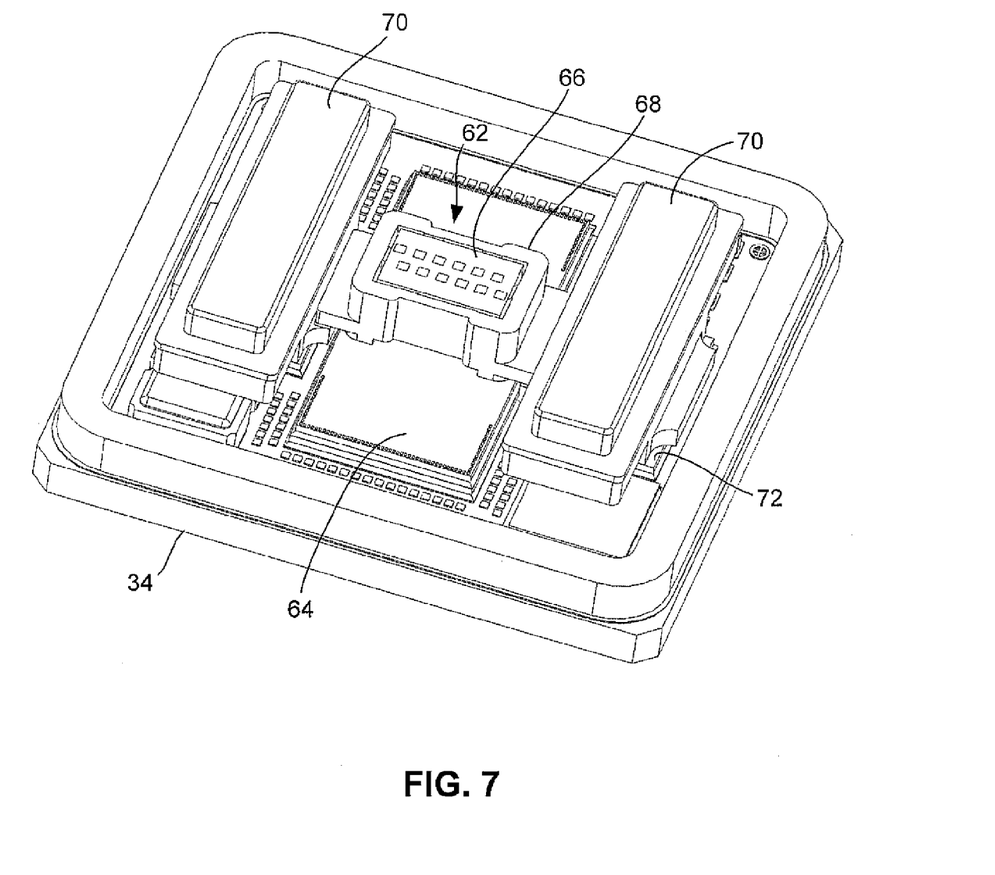
FIG. 7 is a top perspective view of the optical communication module of FIGS. 3-6, with a portion of the housing removed to reveal the interior.

In FIG. 7, a portion of housing 32 is omitted to reveal the interior of optical data communication device 30. As illustrated in FIG. 7, optical data communication device 30 includes an opto-electronic system 62 that comprises a laser chip 64 (e.g., a vertical cavity surface-emitting laser chip) or other opto-electronic chip, a lens device 66, and a frame 68. Lens device 66 has a rectangular, block-like shape. Lens device 66 can be made of glass to promote good optical performance. Frame 68 can be made of plastic, which is economical yet can be molded or otherwise formed to dimensions having precise tolerances. Two heat sinks 70 and a heat spreader 72 are also shown. Heat spreader 72 is mounted on an upper surface of substrate 34.

Figure 8:
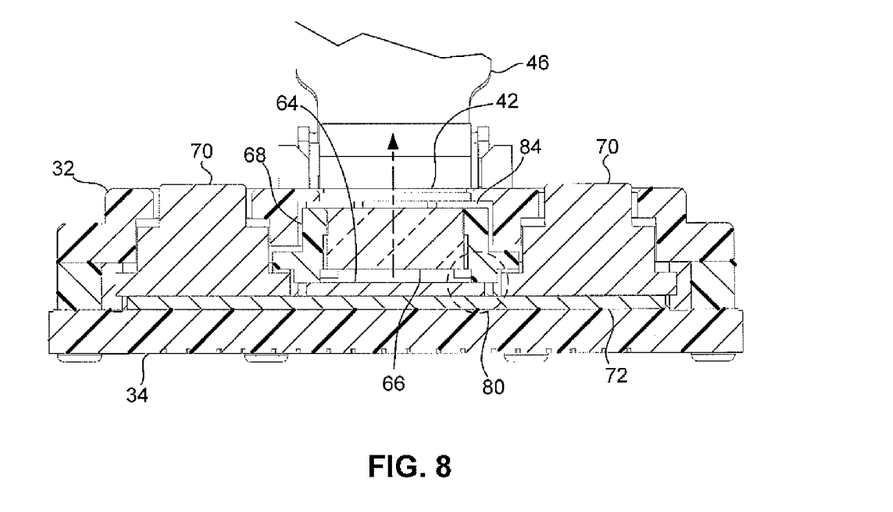
FIG. 8 is a sectional view taken on line 8-8 of FIG. 5.
Figure 9:
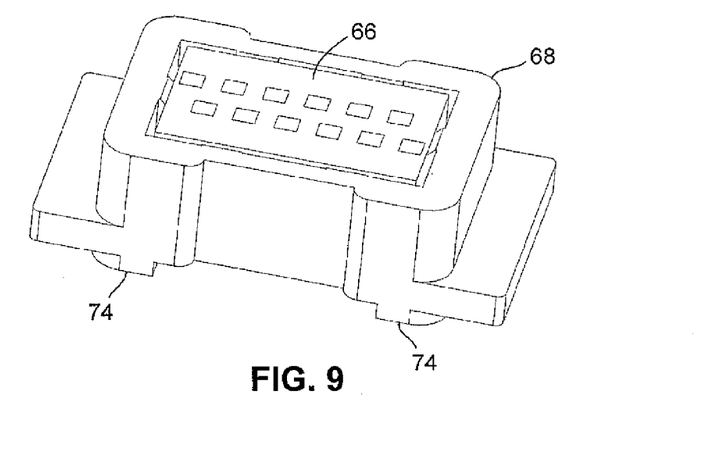
FIG. 9 is a top perspective view of a lens assembly of the optical communication module of FIGS. 3-6.

As more clearly shown in FIG. 8, laser chip 64 is mounted on an upper surface of heat spreader 72 in an orientation in which optical axis 60, along which laser chip 64 emits optical signals, is normal to substrate 34. The optical signals are emitted from the upper surface of laser chip 64 in a direction that is referred to herein as "upward" or "above" laser chip 64. Lens device 66 is retained in frame 68. The optical signals emitted along optical axis 60 pass through lens device 66. Although lens device 66 can redirect the optical signals from one optical axis to another in some embodiments, such redirection is not shown for purposes of clarity. In embodiments (not shown) in which optical data communication device 30 comprises an optical receiver, a photodiode or other light detector chip can serve as an opto-electronic chip instead of or in addition to a laser chip.

Figure 10:
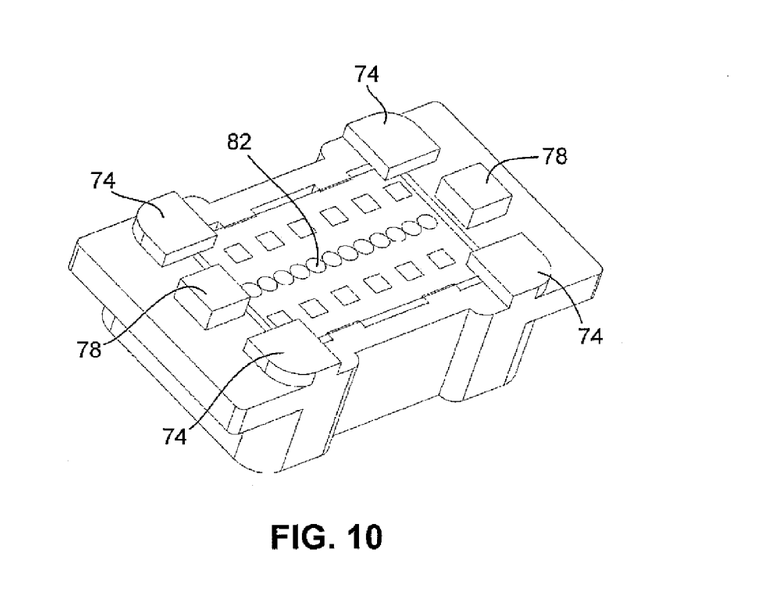
FIG. 10 is a bottom perspective view of the lens assembly of FIG. 9.
Figure 11:
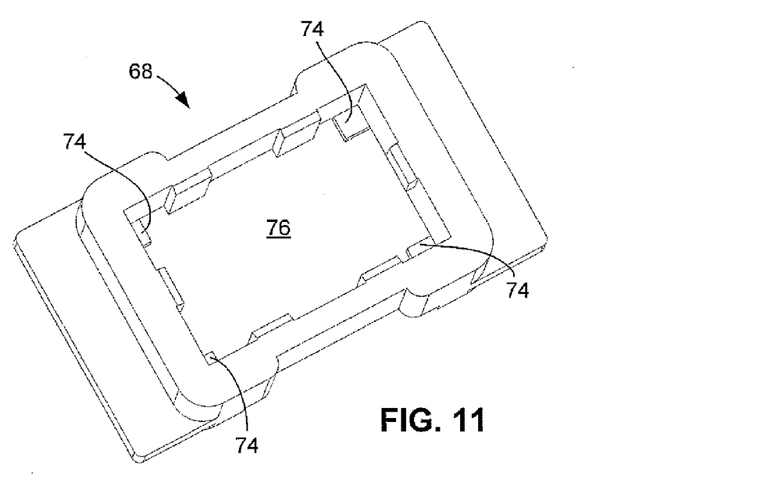
FIG. 11 is a top perspective view of the lens frame of the lens assembly of FIGS. 9-10.
Figure 12:
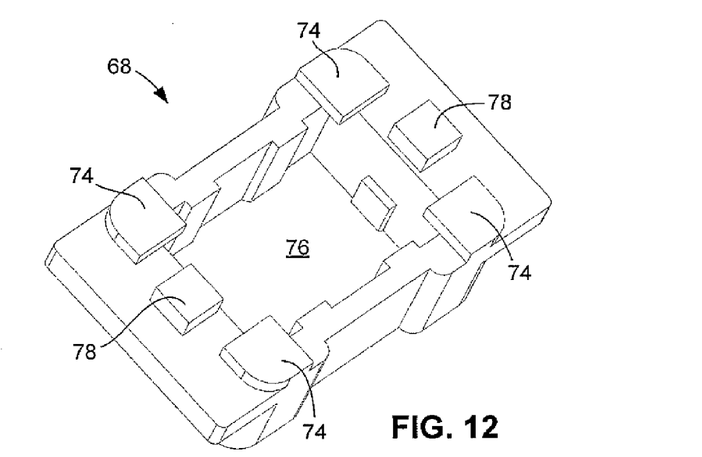
FIG. 12 is a bottom perspective view of the lens frame of FIG. 11.

As illustrated in FIGS. 9-12 frame 68 has a generally rectangular shape defined by four walls having a height similar to the height of lens device 66. Four lens mounting portions 74 on the bottom of frame 68 extend from the corners of frame 68 into a central opening 76 (FIGS. 11-12) defined by the region enclosed by the four walls. The dimensions of the interior surfaces of the walls of frame 68 are similar to the dimensions of lens device 66, such that lens device 66 fits snugly within central opening 76. When lens device 66 is fit within central opening 76, lens mounting portions 74 support the corners of lens device 66 in a shelf-like manner. As illustrated in FIGS. 10 and 12, the bottom of frame 68 has flat frame mounting portions 78 that contact or abut the (flat) upper surface of laser chip 64 in the assembly or arrangement described above with regard to FIG. 8.

Figure 13:
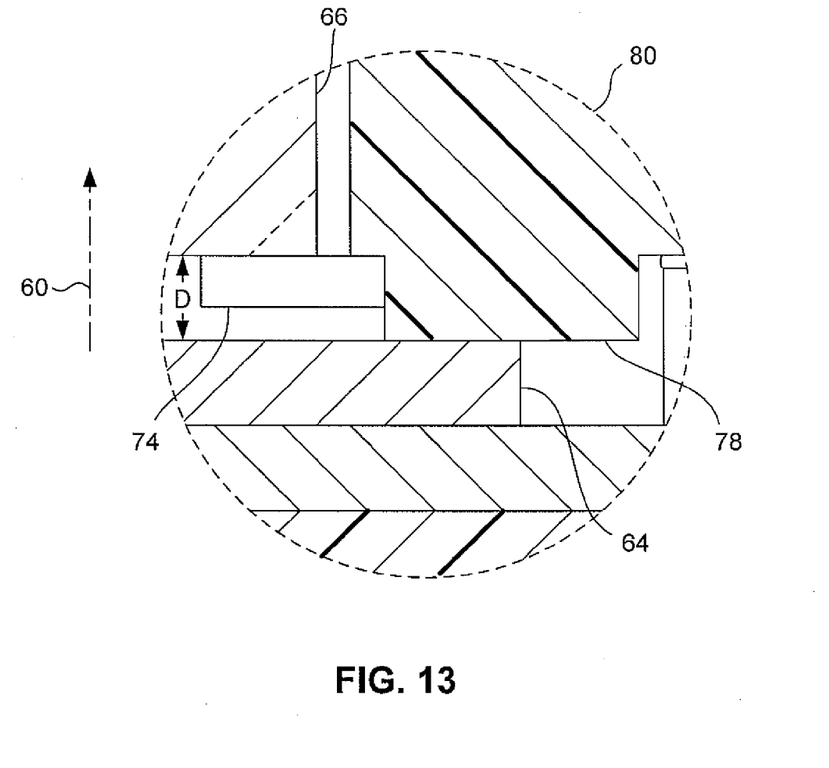
FIG. 13 is an enlargement of a region of FIG. 8.

The region 80 of FIG. 8 is shown enlarged in FIG. 13. Note that the surfaces of lens mounting portions 74 that contact the lower surface of lens device 66 are spaced above (i.e., farther up optical axis 60 than) frame mounting portions 78 that contact the upper surface of laser chip 64. This spacing defines the distance D by which the lower surface of lens device 66 is spaced from the upper surface of laser chip 64. The surfaces of lens mounting portions 74 that contact the lower surface of lens device 66 and the surfaces of frame mounting portions 78 that contact the upper surface of laser chip 64 serve as reference surfaces. By accurately controlling these dimensions, i.e., the distances between these reference surfaces, of frame 68 during its manufacture (by, for example, an injection molding process), the distance D can be accurately fixed. Accordingly, in operation, light signals emitted from laser chip 64 along optical axis 60 travel the accurately fixed distance D from the upper surface of laser chip 64 to a lens element 82 (FIG. 10) on the lower surface of lens device 66. That is, the optical signals pass through a space between the upper surface of laser chip 64 and the lower surface of lens device 66 having a width of D. The distance D can be selected to promote proper collimation of the optical beam (signals) by lens element 82. Note that tolerances in the thickness of laser chip 64 or any adhesive that may be used to mount laser chip 64 have no effect on the accuracy of the distance D.

Returning to FIG. 8, it can also be noted that there is a spacing or gap 84 between an upper surface of lens device 66 and adjacent portions of housing 32. This gap 84 prevents any force that may be exerted on the top of housing 32 by optical connector 40 (FIGS. 3-4) from being transferred to lens device 66, thereby inhibiting undesirable displacement of lens device 66 out of its accurate optical alignment and also protecting it against damage. It can also be noted that the relatively soft plastic of frame 68 helps protect the relatively fragile glass lens device 66.

One or more illustrative embodiments of the invention have been described above. However, it is to be understood that the invention is defined by the appended claims and is not limited to the specific embodiments described.

What is claimed is:

1. An opto-electronic system for an optical data communication device, comprising:
   a substrate;
   an opto-electronic chip mounted on the substrate, the opto-electronic chip having an optical axis normal to the substrate, the opto-electronic chip having a lower surface in contact with a surface of the substrate and an upper surface;
   a frame having a frame mounting portion in contact with the upper surface of the opto-electronic chip and a lens mounting portion spaced above the frame mounting portion with respect to the optical axis of the opto-electronic chip; and
   a lens device retained in the frame and having a lens element aligned with the optical axis of the opto-electronic chip, the lens device having a lower surface in contact with the lens mounting portion of the frame.

2. The opto-electronic system of claim 1, wherein the opto-electronic chip comprises a laser.

3. The opto-electronic system of claim 1, wherein the lens is unitarily formed of a single piece of glass, and the frame is made of a plastic material.

4. The opto-electronic system of claim 1, wherein the frame comprises at least four walls surrounding a central opening, wherein the lens device is disposed within the central opening and enclosed by the at least four walls.

5. The opto-electronic system of claim 4, wherein the lens mounting portion of the frame comprises a plurality of shelf-shaped members, each extending into the central opening and supporting a portion of an edge of the lens device.

6. The opto-electronic system of claim 1, further comprising a housing having a base disposed on the substrate and a connector-receiving portion spaced above and not in contact with the upper surface of the lens device and spaced above and not in contact with the frame.

7. The opto-electronic system of claim 6, further comprising a latch connected to the housing, the latch having a portion movable toward and away from the connector-receiving portion of the housing along a path having a directional component aligned with the optical axis of the opto-electronic chip.

8. The opto-electronic system of claim 7, wherein the latch swings on a hinge toward and away from the connector-receiving portion of the housing.

9. The opto-electronic system of claim 7, wherein a portion of the latch and a portion of the housing are engageable to retain an optical connector in contact with the connector-receiving portion of the housing.

10. A method of operation of an opto-electronic system in an optical data communication device, the opto-electronic system comprising a substrate, an opto-electronic chip mounted on the substrate, a frame, and a lens device, the method comprising:
    communicating optical signals between the opto-electronic chip and the lens device along an optical axis normal to the substrate, the opto-electronic chip having a lower surface in contact with a surface of the substrate and an upper surface, the frame having a frame mounting portion in contact with the upper surface of the opto-electronic chip and a lens mounting portion spaced above the frame mounting portion with respect to the optical axis of the opto-electronic chip, the lens device retained in the frame and having a lens element aligned with the optical axis of the opto-electronic chip, the lens device having a lower surface in contact with the lens mounting portion of the frame, the optical signals passing through a space between the upper surface of the opto-electronic chip and the lower surface of the lens device.

11. The method of claim 10, wherein communicating optical signals comprises activating a laser of the opto-electronic chip.

12. The method of claim 10, wherein the lens is unitarily formed of a single piece of glass, and the frame is made of a plastic material.

13. The method of claim 10, wherein the frame comprises at least four walls surrounding a central opening, wherein the lens device is disposed within the central opening and enclosed by the at least four walls.

14. The method of claim 13, wherein the lens mounting portion of the frame comprises a plurality of shelf-shaped members, each extending into the central opening and supporting a portion of an edge of the lens device.

15. The method of claim 10, further comprising a housing having a base disposed on the substrate and a connector-receiving portion spaced above and not in contact with the upper surface of the lens device and spaced above and not in contact with the frame.

16. The method of claim 15, further comprising a latch connected to the housing, the latch having a portion movable toward and away from the connector-receiving portion of the housing along a path having a directional component aligned with the optical axis of the opto-electronic chip.

17. The method of claim 16, wherein the latch swings on a hinge toward and away from the connector-receiving portion of the housing.

18. The method of claim 16, wherein a portion of the latch and a portion of the housing are engageable to retain an optical connector in contact with the connector-receiving portion of the housing.

* * * * *